(12) United States Patent
Lopparelli et al.

(10) Patent No.: US 7,441,391 B2
(45) Date of Patent: *Oct. 28, 2008

(54) DEVICE FOR FORMING CONTAINERS PRODUCED CONTINUOUSLY FROM A TUBULAR WRAPPER AND UNIT FOR PACKAGING THE CONTAINERS

(75) Inventors: Lucio Lopparelli, Foligno (IT); Umberto Gatti, S. Egidio (IT)

(73) Assignee: IPI S.R.L., Perugia (IT)

( * ) Notice: Subject to any disclaimer, the term of this patent is extended or adjusted under 35 U.S.C. 154(b) by 40 days.

This patent is subject to a terminal disclaimer.

(21) Appl. No.: 11/596,482

(22) PCT Filed: Apr. 13, 2005

(86) PCT No.: PCT/IT2005/000207

§ 371 (c)(1),
(2), (4) Date: Nov. 13, 2006

(87) PCT Pub. No.: WO2005/110855

PCT Pub. Date: Nov. 24, 2005

(65) Prior Publication Data

US 2007/0220837 A1 Sep. 27, 2007

(30) Foreign Application Priority Data

May 13, 2004 (IT) .................. RM 2004 A 000237

(51) Int. Cl.
*B65B 9/06* (2006.01)
*B65B 9/20* (2006.01)
*B65B 51/30* (2006.01)

(52) U.S. Cl. ...................................... 53/551; 53/374.6

(58) Field of Classification Search ................ 53/551, 53/374.3, 374.5, 374.6, 375.4; *B65B 51/30*
See application file for complete search history.

(56) References Cited

U.S. PATENT DOCUMENTS

| 3,320,718 | A | * | 5/1967 | Thesing ........................ 53/551 |
| 3,849,965 | A | * | 11/1974 | Dominici ...................... 53/551 |
| 4,109,792 | A | * | 8/1978 | Greenawalt et al. ........ 53/374.5 |
| 4,305,240 | A | * | 12/1981 | Grevich et al. ............. 53/374.6 |
| 4,483,126 | A | * | 11/1984 | Henry .......................... 53/551 |
| 4,614,078 | A | * | 9/1986 | Kawabe ....................... 53/551 |
| 4,663,916 | A | * | 5/1987 | Ohlsson ....................... 53/551 |
| 5,220,771 | A | | 6/1993 | Burns et al. |

FOREIGN PATENT DOCUMENTS

| EP | 1 125 847 A | 8/2001 |
| EP | 1 234 772 A | 8/2002 |

* cited by examiner

*Primary Examiner*—Stephen F Gerrity
(74) *Attorney, Agent, or Firm*—Arent Fox LLP

(57) ABSTRACT

A device (8) for forming containers (2) produced continuously from a tubular wrapper (3) fed along a substantially vertical direction of advance (A). The device has at least one support carriage (8a) movable along a respective closed path having at least one active segment parallel to the direction of advance (A). The carriage (8a) supports a sealing base (11) able to be associated to a first lateral face (2a) of the tubular wrapper (3) at a sealing region (Z) of the wrapper (3). A contrasting element (14) is removably associated to the support carriage (8a) and movable between a first closed position in which it is approached to the base (11) and abuts against a second lateral face (2b) of the tubular wrapper (3) opposite to the first lateral face (2a) at the sealing region (Z), and a second position in which it is movable away from the base (11).

18 Claims, 13 Drawing Sheets

DEVICE FOR FORMING CONTAINERS PRODUCED CONTINUOUSLY FROM A TUBULAR WRAPPER AND UNIT FOR PACKAGING THE CONTAINERS

CROSS REFERENCE TO RELATED APPLICATION

This application is a National Stage entry of International Application Number PCT/IT2005/000207, filed Apr. 13, 2005, and claims priority of Application Number RM2004A000237 filed May 13, 2004, in Italy. The disclosures of the prior applications are hereby incorporated herein in their entirety by reference.

TECHNICAL FIELD

The present invention relates to a device for forming containers produced continuously from a tubular wrapper fed along a substantially vertical direction of advance. The present invention further relates to a unit for packaging the aforesaid containers in which the forming device finds advantageous use.

BACKGROUND ART

The invention is in the sector of packaging containers of incoherent material, generally containers of liquids for human consumption. Such containers are produced in continuous fashion from a tubular wrapper fed along a substantially vertical direction. The tubular wrapper is filled with incoherent material and subsequently sealed and cut along transversal seal lines which define the individual containers.

As is well known, the wrapper material, generally constituted by heat-sealable paper material, is continuously unwound from a reel towards a folding device adapted to join opposite longitudinal edges of the wrapper to each other. The tubular wrapper is then advanced along a vertical path through a filling unit. The filling unit delivers the incoherent material inside the tubular wrapper through an upper opening of the tubular wrapper. Downstream of the filling unit is a forming device provided with heated bars adapted to perform a series of seals, transverse to the longitudinal axis of the tubular wrapper. The heated bars are mounted on a fixed support structure and are movable only to approach each other. In this way, the container containing the incoherent material is defined between two consecutive seal lines. Lastly, a cutting member positioned downstream of the forming device separates the containers from each other by a transverse cut along the seal line.

The known packaging units described above have important drawbacks, which are linked mainly to the forming device.

It should be noted that the heated bars are positioned at opposite sides of the tubular wrapper and movable to approach each other to press the region to be sealed along a transverse direction to the direction of vertical motion of the tubular wrapper. Because of the movement of the bars, the tubular wrapper is braked intermittently, causing considerable damage to the seal region. During the motion of the wrapper, the bars slide on the wrapper causing incorrect seals and the damage to the sealed area.

The prior art discloses devices able to overcome the aforementioned problems by providing bars movable along the path of the tubular wrapper.

As is described for example in European patent EP1125847, the forming device provided with movable bars is constituted by two adjacent support frames having respective belts movable along a closed path. The tubular wrapper is actuated through the belts, at a rectilinear segment of the closed path, parallel to the direction of actuation of the wrapper. Each belt bears a plurality of carriages which are movable along the path. Each carriage bears a heated bar adapted to abut on the surface to be heated of the tubular wrapper. In this situation, when the carriages are positioned at the rectilinear segment, the bars of each pair of carriages abut against each other pressing the region to be sealed of the tubular wrapper. The pressing operation is then performed while each pair of carriages is maintained in motion along the direction of actuation of the tubular wrapper. The device described above has important drawbacks, although it solves the problem of avoiding any relative sliding between the bars and the wrapper.

These drawbacks are linked mainly to the structural complexity of the sealing device and of the overall size presented thereby. It should be noted that the structure constituted by two frames, each of which has a belt, is very bulky, further considering that each belt has respective motion transmission member. Moreover, it should be considered that each pair of carriages must necessarily be in synchrony during the sealing operation to make the pressing between one bar and the other efficient. To maintain the correct positioning of the carriages, electronic means are provided for controlling and adjusting. Such means are sometimes highly complex and have an excessive cost of construction. Consequently, the presence of means for controlling and adjusting the belts causes high costs for the production and/or commercialisation of the known devices.

SUMMARY OF INVENTION

An object of the present invention is to solve the problems noted in the prior art by proposing a forming device and a unit for packaging containers able to solve the aforementioned drawbacks of the prior art.

In detail, the object of the present invention is to provide a device for forming containers having a simple, economical, reliable structure, with small size which is able to seal tubular wrapper following the advancing path of the wrapper.

BRIEF DESCRIPTION OF THE DRAWINGS

Further characteristics and advantages shall become more readily apparent from the detailed description of a preferred, but not exclusive, embodiment of a forming device and a unit for packaging containers, in accordance with the present invention. This description shall now be provided below with reference to the accompanying figures, provided purely by way of non limiting indication, in which.

DETAILED DESCRIPTION OF THE INVENTION

Figure 1:
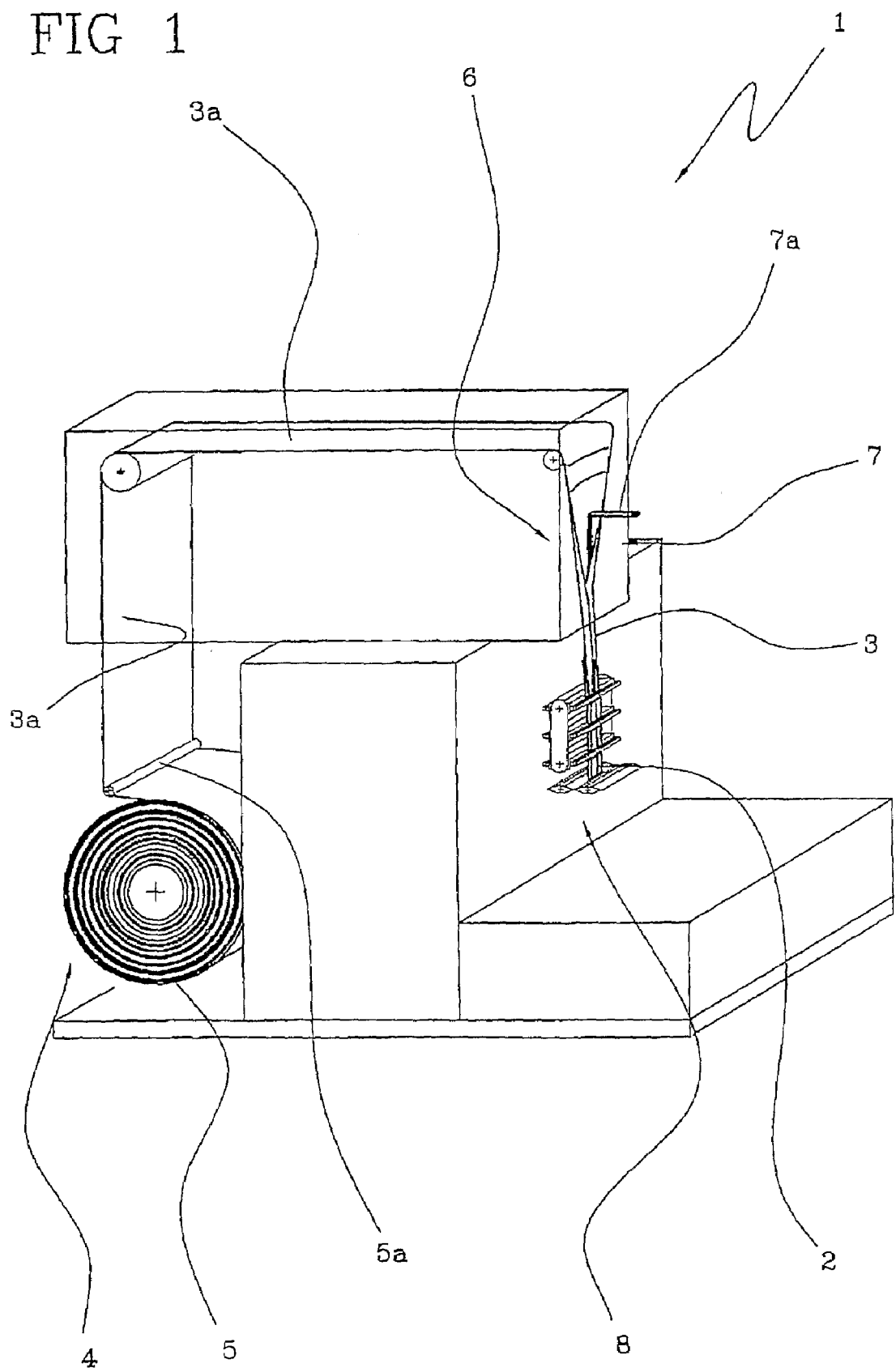
FIG. 1 shows a schematic perspective representation of a unit for packaging containers produced continuously from a tubular wrapper with some parts removed to better show others.

With reference to the accompanying figures, reference number 1 globally designates a unit for packaging containers 2 produced continuously from a tubular wrapper 3. It should be specified that FIG. 1 schematically shows, by way of example, the unit 1 in which some technical details have been removed for better clarifying the general structure of the unit 1.

In detail, the unit 1 is constituted by means 4 for feeding a continuous strip 3a of paper material from which the tubular wrapper 3 is obtained, as shall be better explained hereinafter. The feeding means 4 are constituted by a reel 5 of the continuous strip 3a and by transmission rollers 5a adapted to feed the strip 3a along a predefined path. Downstream of the feeding means 4 is a forming member 6 able to join opposite longitudinal edges of the continuous strip 3a to define the tubular wrapper 3. The forming member 6, which is not described and illustrated in detail, is constituted by a series of sliding guides, respectively twisted to overturn at least one longitudinal edge of the strip 3a on the other and seal the edges together. The tubular wrapper 3 is then fed along a vertical direction A of the respective path, at a member 7 for filling the wrapper.

In greater detail, the tubular wrapper 3 has a respective upper opening corresponding to a portion of the belt 3a, not yet sealed, in which the incoherent material is dispensed. The filling member 7 is constituted by a dispensing nozzle 7a positioned at the opening of the tubular wrapper 3 and engaged with a respective conduit for containing the incoherent material. For example, if the incoherent material is constituted by a liquid, the nozzle 7a dispenses the liquid inside the tubular wrapper filling the latter from the lower portion to a predetermined height. Thus filled, the tubular wrapper passes by a forming device 8 which constructs the containers 2 from the tubular wrapper 3.

Figure 2:
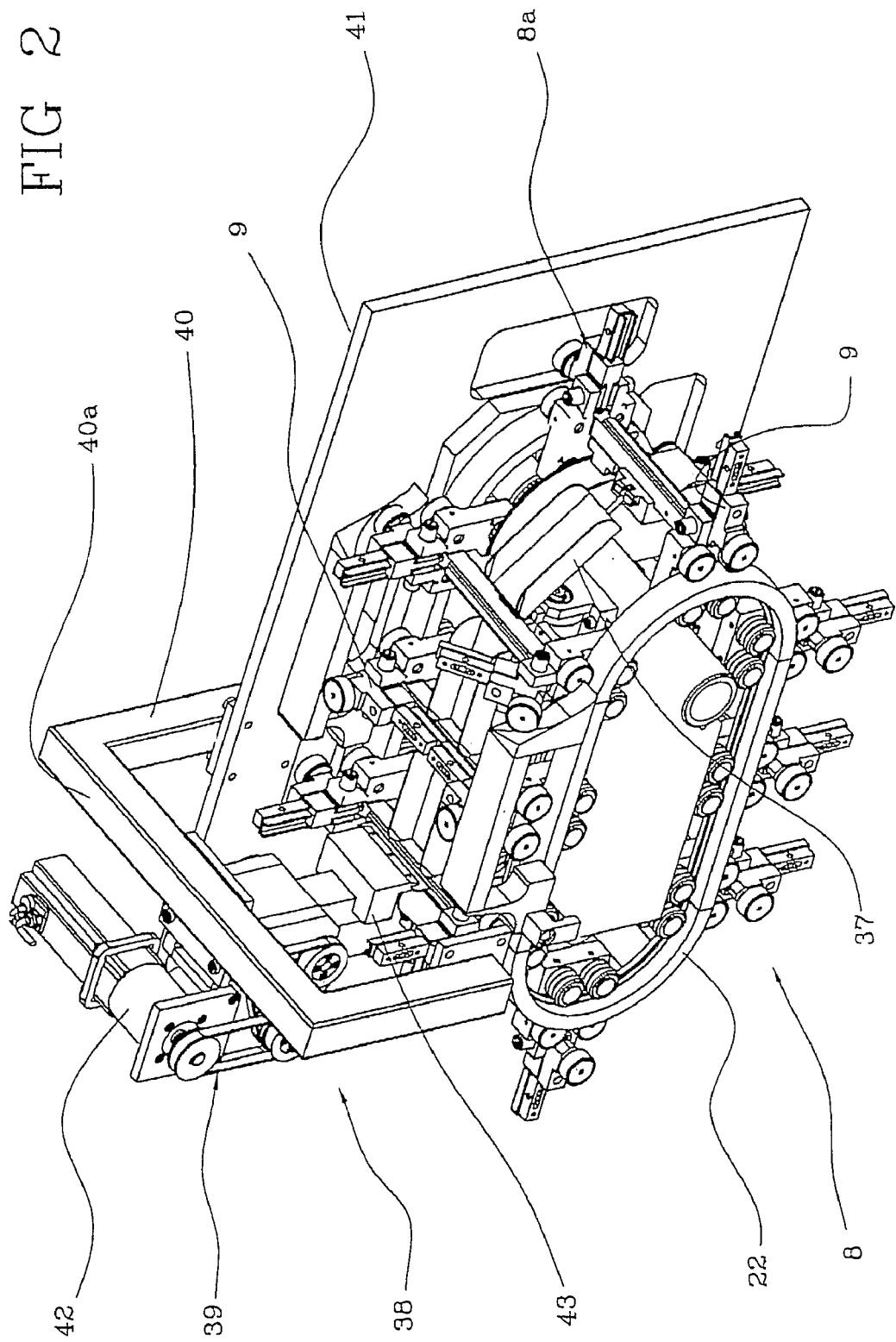
FIG. 2 is a perspective view of a forming device according to the present invention, schematically shown in FIG. 1.

The forming device 8, illustrated in detail in FIG. 2, is constituted by at least one support carriage 8a movable along a respective closed path. This path has substantially elliptical shape and is constituted by at least one active segment that is parallel and coincident with the vertical direction of advance A of the tubular wrapper 3, and by a passive segment opposite to the active segment.

Advantageously, the device 8 has a plurality of carriages 8a actuated along the path by respective actuating means 10 as shall be better described below. In detail, each carriage 8a is constituted by a pair of shoes 9 associated with a respective sealing base 11 at opposite ends 11a of the base. As further illustrated in the detail of FIG. 5 and FIG. 6, each shoe 9 has a body 12 having substantially parallelepiped conformation in which is defined an inner surface 12a engaged to one of the ends 11a of the base 11 and an outer surface 12b opposite to the inner surface 12a. At the outer surface 12b of the body 12 are operatively associated a plurality of sliding elements 13, preferably constituted by rotatable casters 13a. More in detail, each body 12 has three casters 13a rotatable about respective axes, transverse to the development of the active segment of the path. At least two of the three casters 13a are advantageously aligned to each other along the development of the path, whilst the remaining caster is positioned below the first two. Each body 12 also has an upper portion 12c positioned above the base 11 in which is obtained a seat 12d adapted to house a contrasting element 14.

Figure 11:
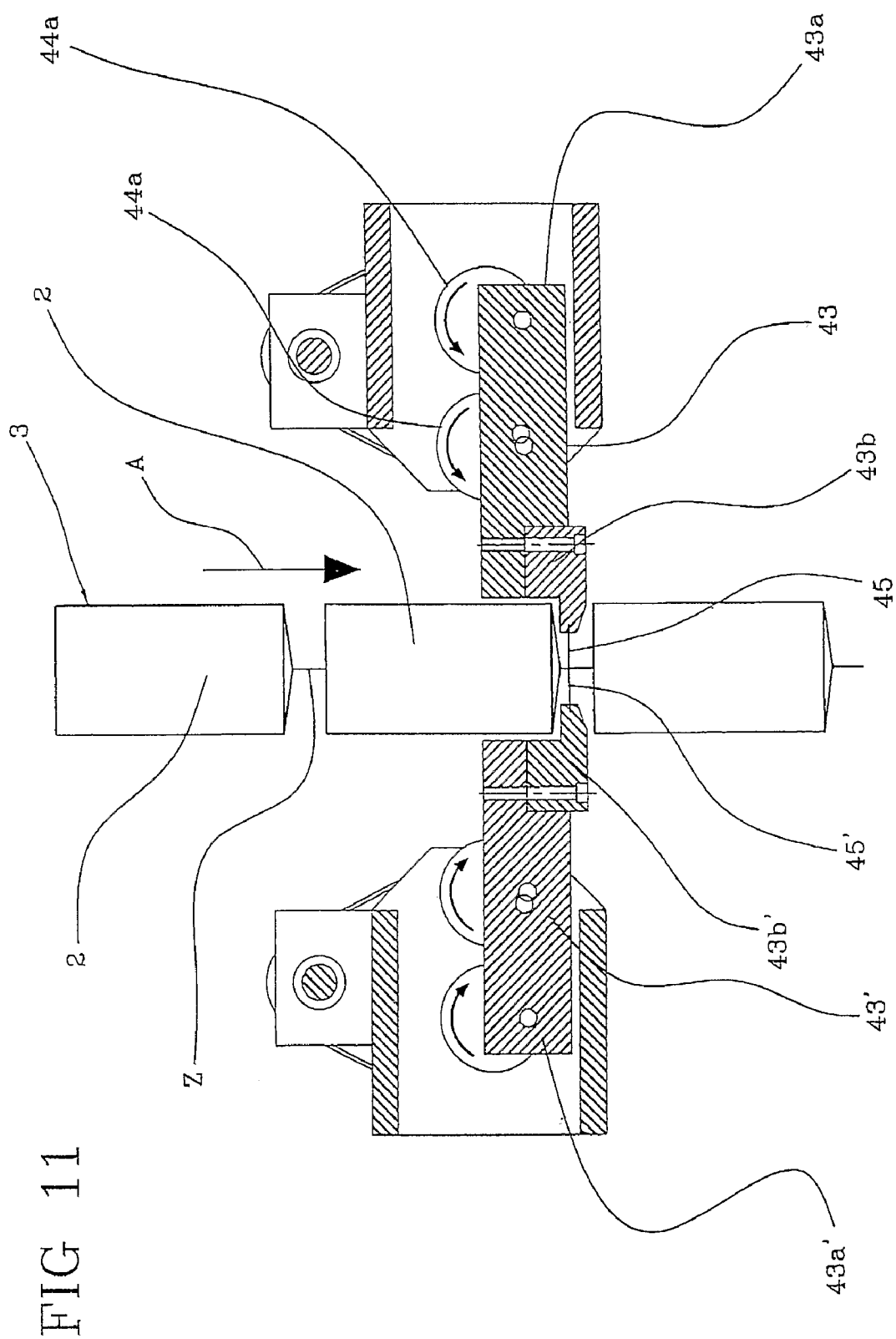
FIGS. 11, 12 and 13 respectively illustrated schematic side elevation views of additional variants of the construction detail of FIG. 10.
Figure 12:
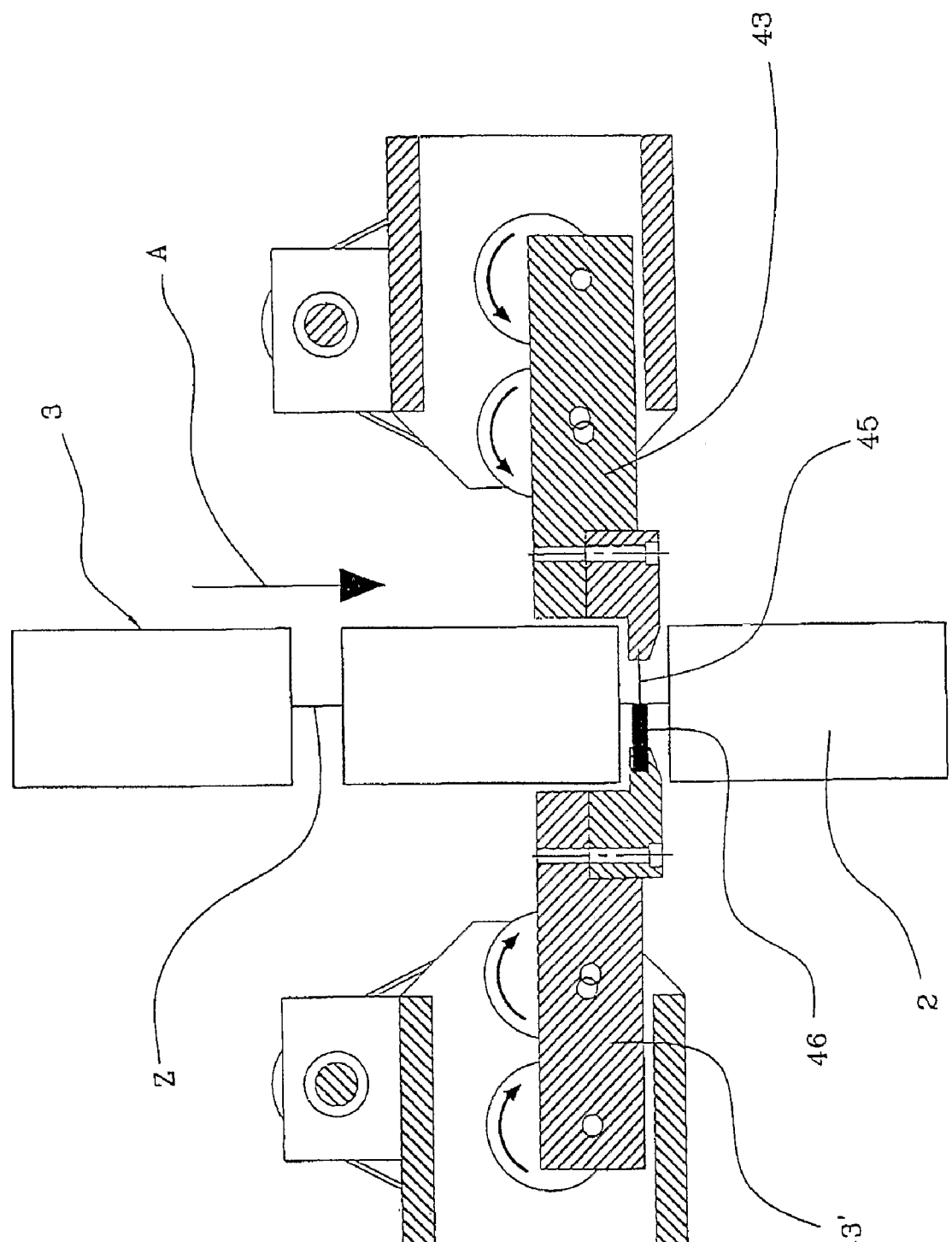
Figure 13:
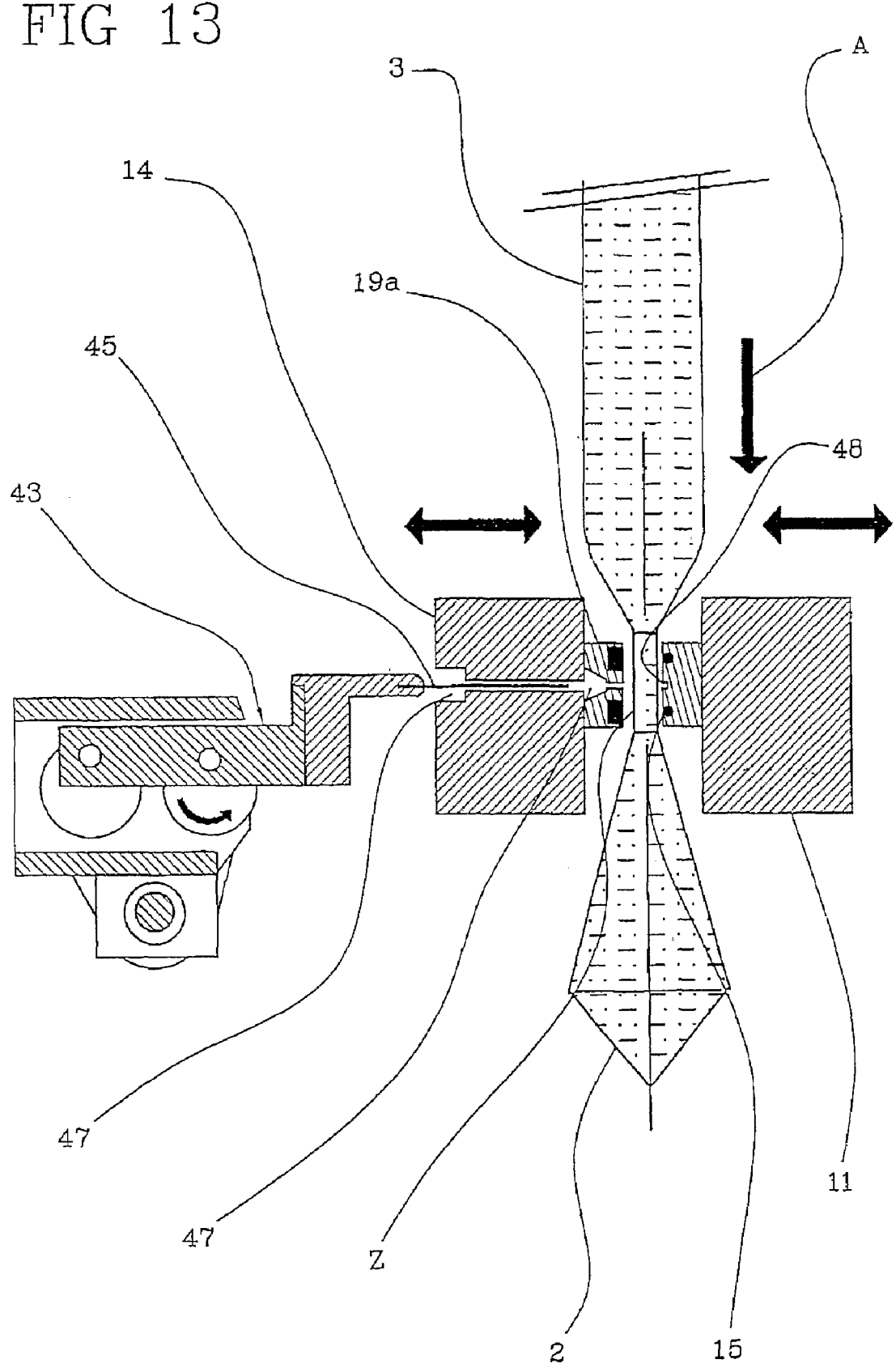

As mentioned above, between each shoe 9 a base 11 is provided having substantially parallelepiped conformation and developing along a respective longitudinal dimension, transverse to the aforementioned active segment. The sealing base 11 is adapted to be associated to a first lateral face 2a of the tubular wrapper 3, at a seal region Z of the wrapper 3. It should be noted that the seal region Z, which is illustrated more clearly in FIGS. 11 through 13, is constituted by a segment that is transverse to the longitudinal development of the tubular wrapper 3 where a first lateral face 2a of the wrapper 3 is joined with a second lateral face 2b opposite to the first lateral face 2a. In this way, each individual container 2 is defined between two seal regions Z. The sealing base 11 has a first surface 15 able to be associated to the first lateral face 2a of the wrapper 3 and having longitudinal development corresponding to the seal region Z. Preferably, the first surface 15 has respective sealing means, not further described in detail. For example, said sealing means can be constituted by an electrically heated lamina, a radio frequency emitter, or an ultrasound emitter.

Figure 4:
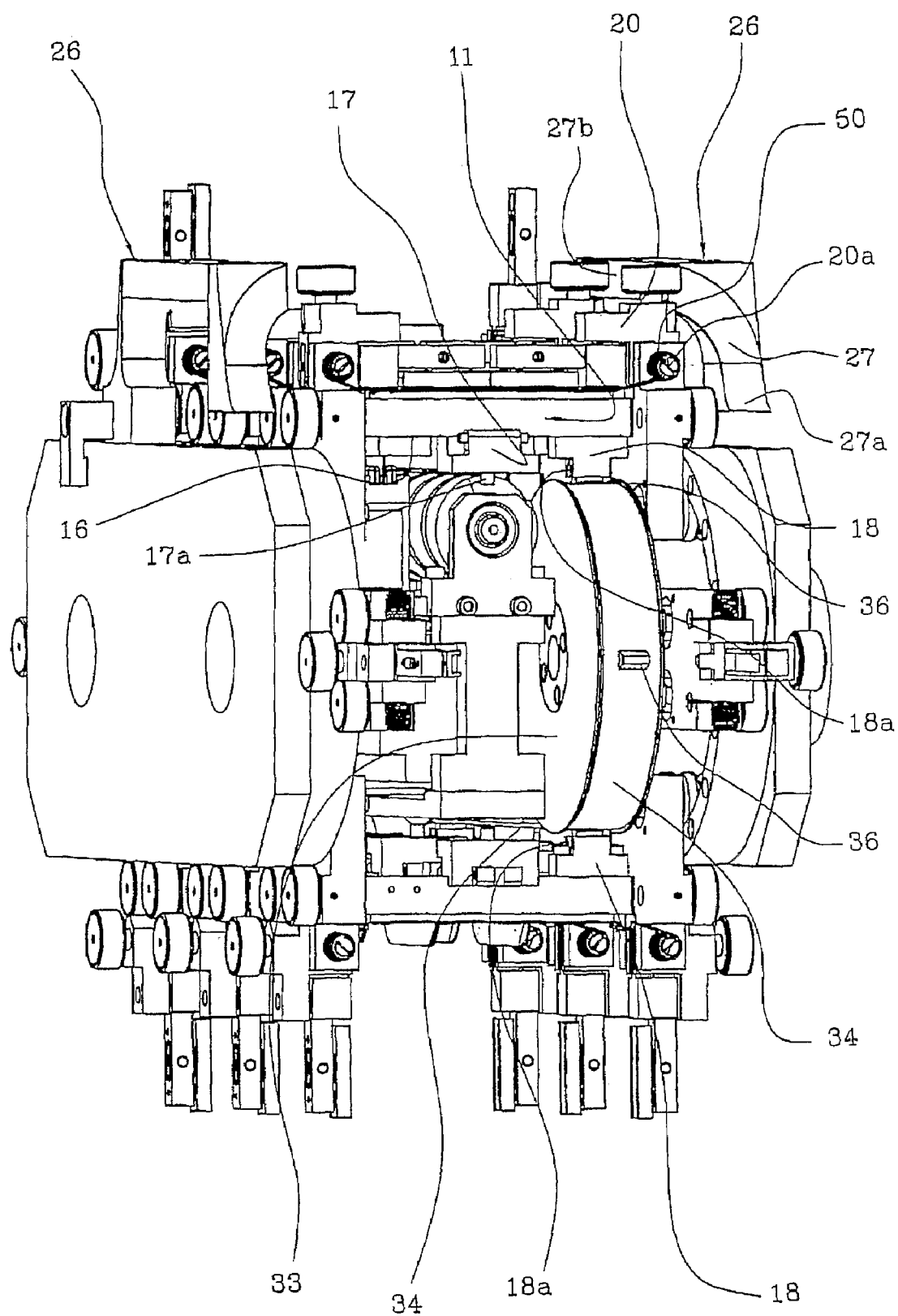
FIG. 4 is a perspective view of a construction detail of the forming device of FIG. 2.

As is better illustrated in FIG. 4, each sealing base 11 also has a second surface 16 opposite and parallel to the first surface 15. From the second surface 16, a first and a second projecting element 17, 18 are provided side by side to each other. The first projecting element 17 has an insertion pivot 17a which extends transversely to the planar surface of the second surface 16 below the base 11. The second projecting element 18 has an opening 18a obtained on the element 18 and oriented below the base 11.

As previously mentioned, each body 12 of the respective shoes 9 has an upper portion 12c in which is obtained the seat 12d able to house the contrasting element 14. Each shoe 9 has a contrasting element 14 movable between a first closed position in which the contrasting element 14 approaches the base 11 and abuts on the second lateral face 2b of the tubular wrapper 3 at the seal region Z, and a second position in which the contrasting element 14 moves away from the base 11.

In detail, each carriage 8a has two contrasting elements 14 associated at respective opposite ends 15a of the first surface 15 and each of which extends from the respective end 15a to a median portion of the first surface 15. The contrasting elements 14 of each carriage 8a are movable symmetrically between the first position, in which they are side by side along a same longitudinal axis (see for example FIGS. 4 and 5), and the second position in which they face each other and are transverse to the longitudinal development of the first surface 15 (see for example FIG. 3).

In yet more detail, each contrasting element 14 includes a bar 19 having a respective active surface 19a which, in the first position of the contrasting element 14, is able to abut on the first surface 15 of the base 11. Advantageously, the active surface 19a of the bar 19 can also have known sealing means, previously described in exemplifying fashion. The pressure exerted by the active surface 19a of the bar 19 and of the first surface 15 of the base 11 determines the pressing of the seal region Z of the tubular wrapper and the consequent sealing thereof.

Each bar 19 also has an end portion 20 positioned at an end 11a of the base 11. In particular, the end portion 20 is inserted rotatably in the seat 12d obtained in the upper portion 12c of the respective body 12. In still further detail, the end portion 20 is inserted in the upper portion 12c by means of a through pivot 20a, in such a way as to make the bar 19 rotatable about an axis that is perpendicular to the planar development of the first surface 15 of the base 11. Additionally, at each end portion 20 of the respective bar 19, a sliding element 13 is positioned above the bar 19. This sliding element, too, is constituted by a caster 13a rotatable about a respective axis, transverse to the longitudinal development of the respective bar 19.

The means 10 for actuating the carriages 8a have at least one support guide 22 to guide the carriages 8a along the closed path. Advantageously, as shown in the accompanying figures, two support guides 22 are provided, parallel and at a distance from each other, each of which is associated to each shoe 9 of each carriage 8a. In greater detail, each guide 22 includes a rail 22a extending along a substantially elliptical path, corresponding to the development of the closed path. The casters 13a of each body 12 rotate on the respective rail 22a, in such a way as to slide along the close path.

Figure 3:
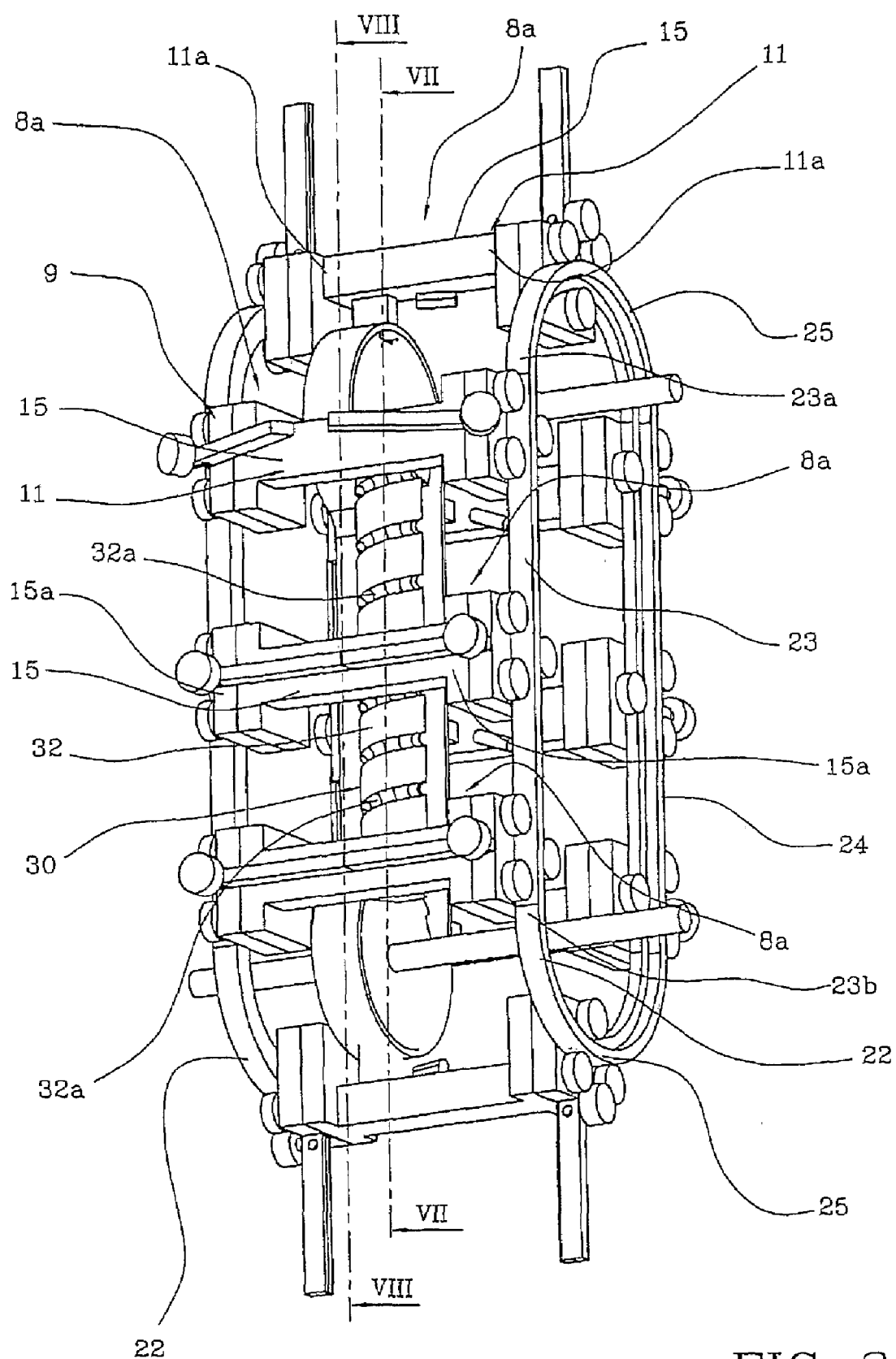
FIG. 3 is a perspective, schematic view of the device illustrated in FIG. 2 with some parts removed to better show others.
Figure 5:
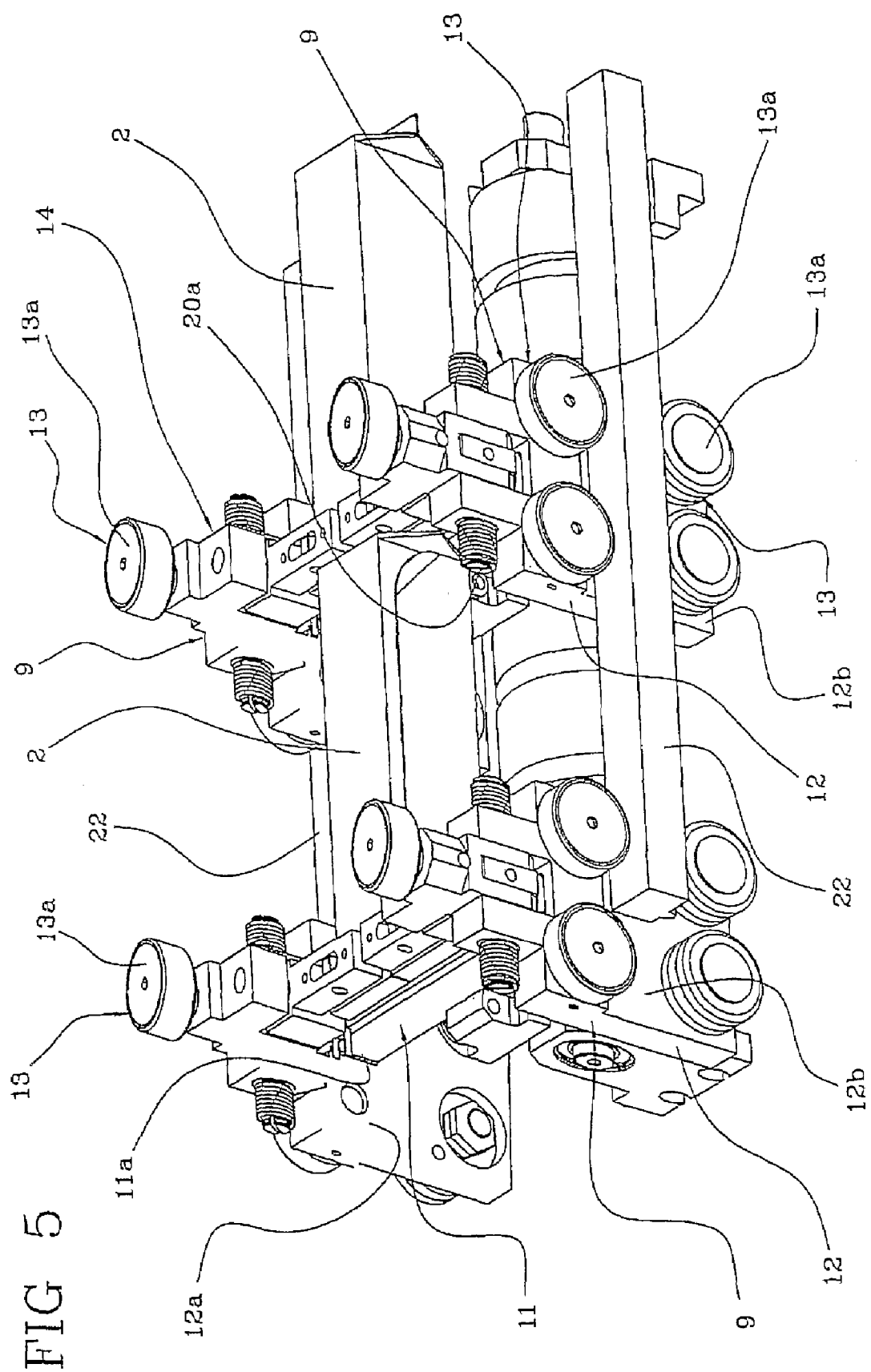
FIG. 5 is a perspective view of a construction detail of the forming device.
Figure 6:
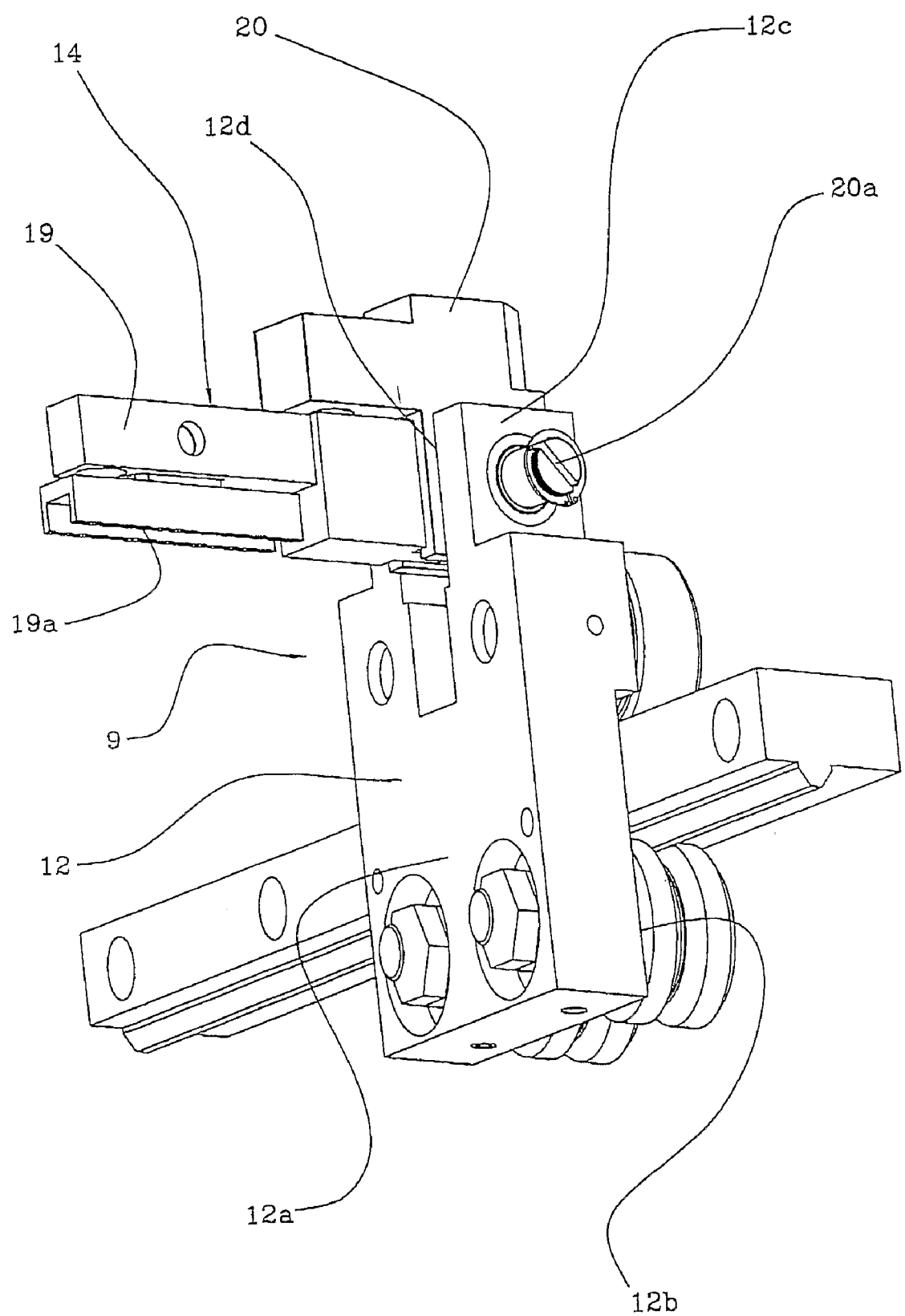
FIG. 6 is a perspective view of an additional construction detail of the forming device.

As shown in detail in FIG. 5, each rail 22a is interposed between the sliding elements 13 in such a way that for each body 12 of the shoe 9 two casters 13a are positioned aligned to each other on an upper surface 22b of the rail 22a, and that a third caster 13a is placed on a lower surface 22c of the rail 22a. With reference to FIG. 3, it should be noted that each rail 22a includes a primary rectilinear portion 23 parallel to the direction of advance A of the tubular wrapper and corresponding to the active segment of the closed path. Moreover, each rail 22a has a secondary rectilinear portion 24 opposite and parallel to the primary rectilinear portion 23 and two arched junction portions 25 between the primary 23 and secondary 24 rectilinear portions. The secondary rectilinear portion 24 and the arched portions 25 constitute the passive segment of the closed path. Each guide 22 also has a side panel 26 positioned at the primary rectilinear path 23 and able to be engaged with the bar 19 to actuate the contrasting elements 14 between their first and second position.

In detail, the side panels 26, each of which is associated with a respective guide 22, include a contrasting surface 27, twisted and facing the carriages 8a. In yet closer detail, as better shown in FIG. 4, each contrasting surface 27 has a first portion 27a parallel to the planar development of the first surface 15 of the base 11, and a second portion 27b consecutive to the first portion 27 and transverse to the planar development of the first surface 15. Each caster 13a engaged on the respective end portion 20 of the corresponding bar 19 rotates on the contrasting surface 27 to rotate the bar 19 between the first and second position. Advantageously, when each caster 13a associated to the respective bar 19 rotates on the first portion 27a of the contrasting surface 27, the corresponding contrasting element 14 is in the respective second position in which the contrasting element 14 is detached from the respective base 11. During the advance of the carriage 8a the caster 13a associated to the respective bar slides on the twisted portion rotating the contrasting element 14 about the pivot 20a, until the caster 13a is able to slide on the second portion 27b of the contrasting surface 27b, and the corresponding contrasting element 14 is positioned in the respective second position in which the contrasting element 14 approaches the base 11.

Figure 7:
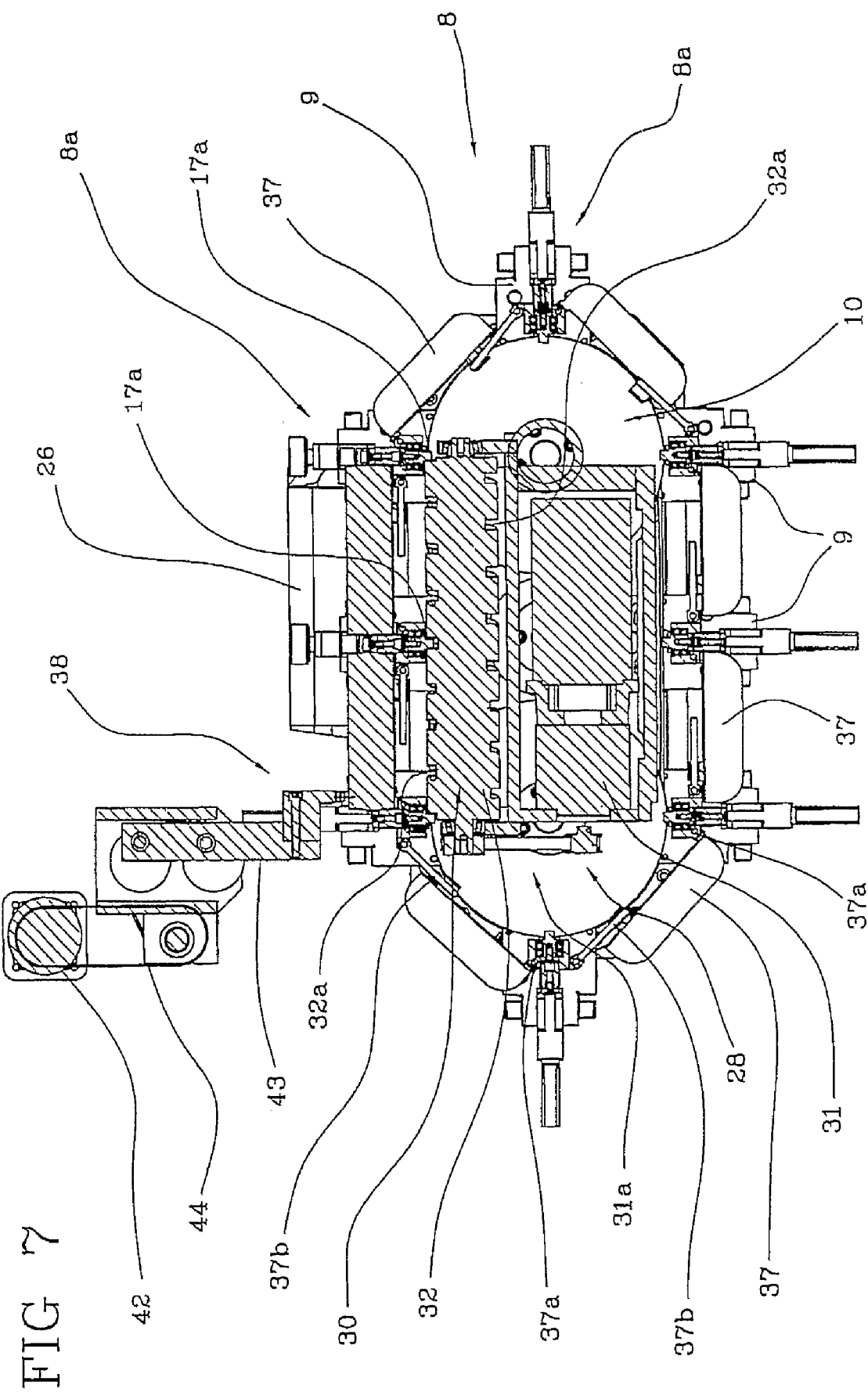
FIG. 7 is a side elevation view partially sectioned along the lines VII-VII of the forming device shown in FIG. 3.

The actuating means 10 also have a first motor member 28 to actuate the carriages 8a along the active segment of the close path and a second motor member 29 to actuate the carriages 8a along the passive segment opposite to the active segment. As shown in FIG. 7, the first motor member 28 has a transport element 30 whose longitudinal extent is parallel to the active segment and associated with a motor 31. Both the motor 31 and the transport element 30 are interposed between the guides 22. Preferably, the transport element 30 is constituted by an auger 32 rotatable about a longitudinal axis parallel to the active segment.

More in particular, the auger 32 includes a cylindrical body having an outer surface in which is obtained a helical cavity 32a. When a carriage is positioned in the active segment, the insertion pivot 17a of the first projecting element 17 of the respective base 11 is inserted in the helical cavity 32a. Advantageously, as a result of the rotation of the auger 32, the pivot 17a slides along the helical cavity 32a driving the base 11 and the respective pair of shoes 9 along the active segment corresponding to the longitudinal development of the auger 32. The auger 32 is set in rotation by the motor 31 through appropriate motion transmission members 31a, not further described in detail. For example, said transmission members 31 can include a pair of pulleys associated respectively with the drive shaft and to an end of the auger and linked to each other by a belt.

It should be specified that the accompanying figures show an auger 32 having the respective helical cavity 32a with constant pitch, in order to maintain constant the actuation velocity of every carriage 8a along the active segment for the same angular velocity of the auger 32. However, a helical cavity 32a with non-constant pitch may be provided to vary the actuation velocity of the carriages 8a. For example, at one end of the auger 32 placed at a final portion of the active segment, the helical cavity 32a may have a pitch (distance between a point of the cavity and the next symmetrical point) that is greater than the rest of the auger 32. In this way, when the carriage 8a slides along the greater pitch of the cavity 32a, the carriage 8a increases its speed because of the greater distance of the pitch.

Alternatively, variations in the size of the pitch of the helical cavity 32a may be provided to quicken or slow the travel of the carriages 8a in the active segment.

Figure 9:
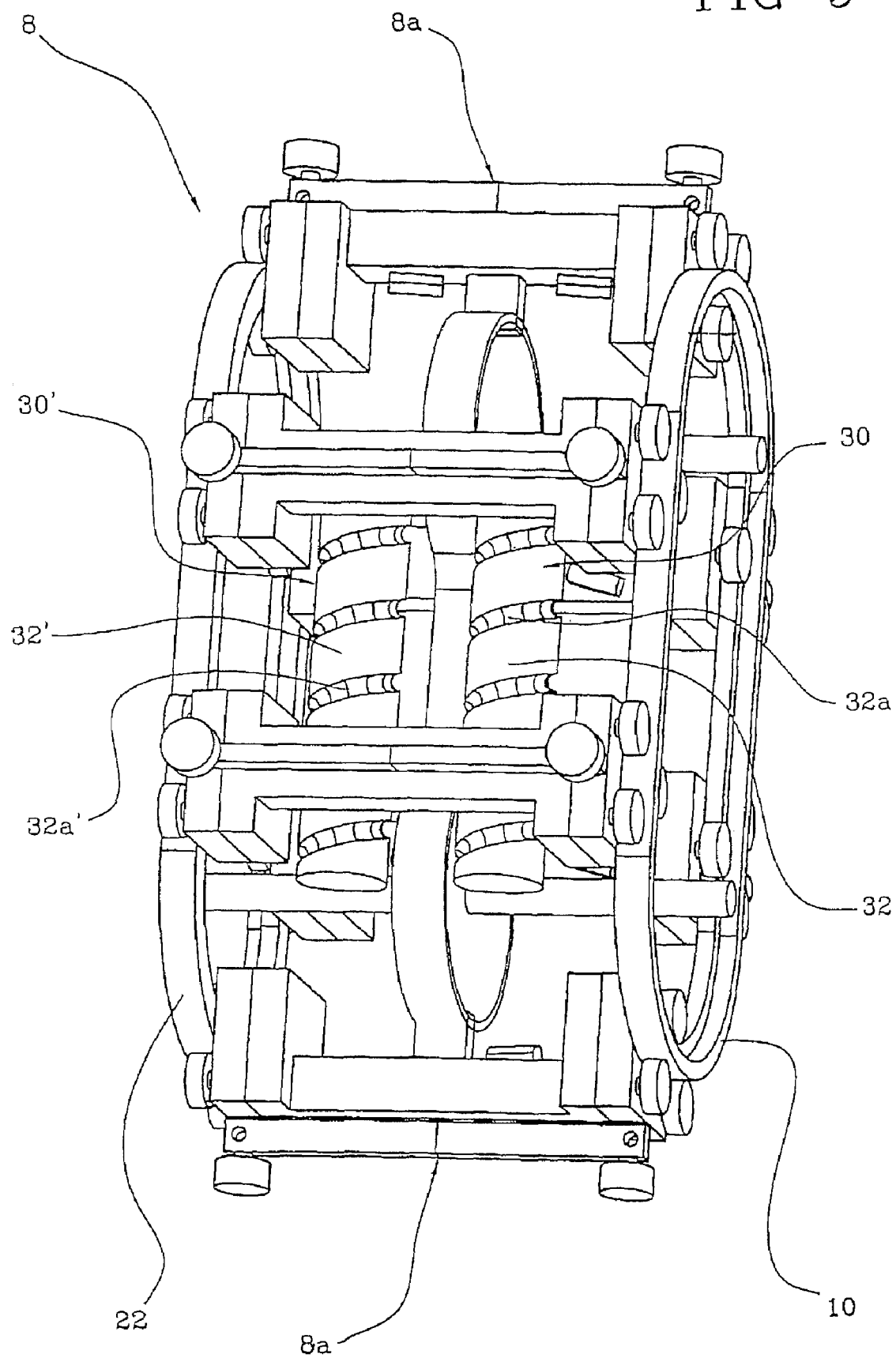
FIG. 9 is a perspective schematic view of the device shown in FIG. 2 with some parts removed to better show others, in accordance with a second embodiment.

In a further alternative embodiment shown in FIG. 9, the first motor member 28 is constituted by a first and a second transport element 30 and 30' set side by side. In particular, the two transport elements 30 and 30' respectively include a first and a second auger 32 and 32' extending longitudinally, mutually parallel and parallel to the active segment. The first and the second auger 32 and 32' have, respectively, the helical cavities 32a and 32a' with mutually different pitch, i.e., one of the cavities has a greater distance between one point and its next symmetrical point that the other helical cavity.

The bases 11 belonging to respective carriages 8a have the first projecting element 17 positioned at the first or at the second auger 32 and 32'. In this way, the base 11 of a carriage 8a has the respective pivot 17a associated to the helical cavity 32a of the first auger 32 and the subsequent carriage 8a has the respective pivot 17a associated to the helical cavity 32a' of the second auger 32'. In this way, every carriage 8a can be actuated along the active segment at a different speed from the subsequent and from the previous carriage 8a.

Alternatively, a first and a second auger 32 and 32' can be provided, with respective helical cavities having the same pitch. The two augers are actuated independently of each other and with different velocity to differentiate the velocity of advance of each carriage 8a.

Figure 8:
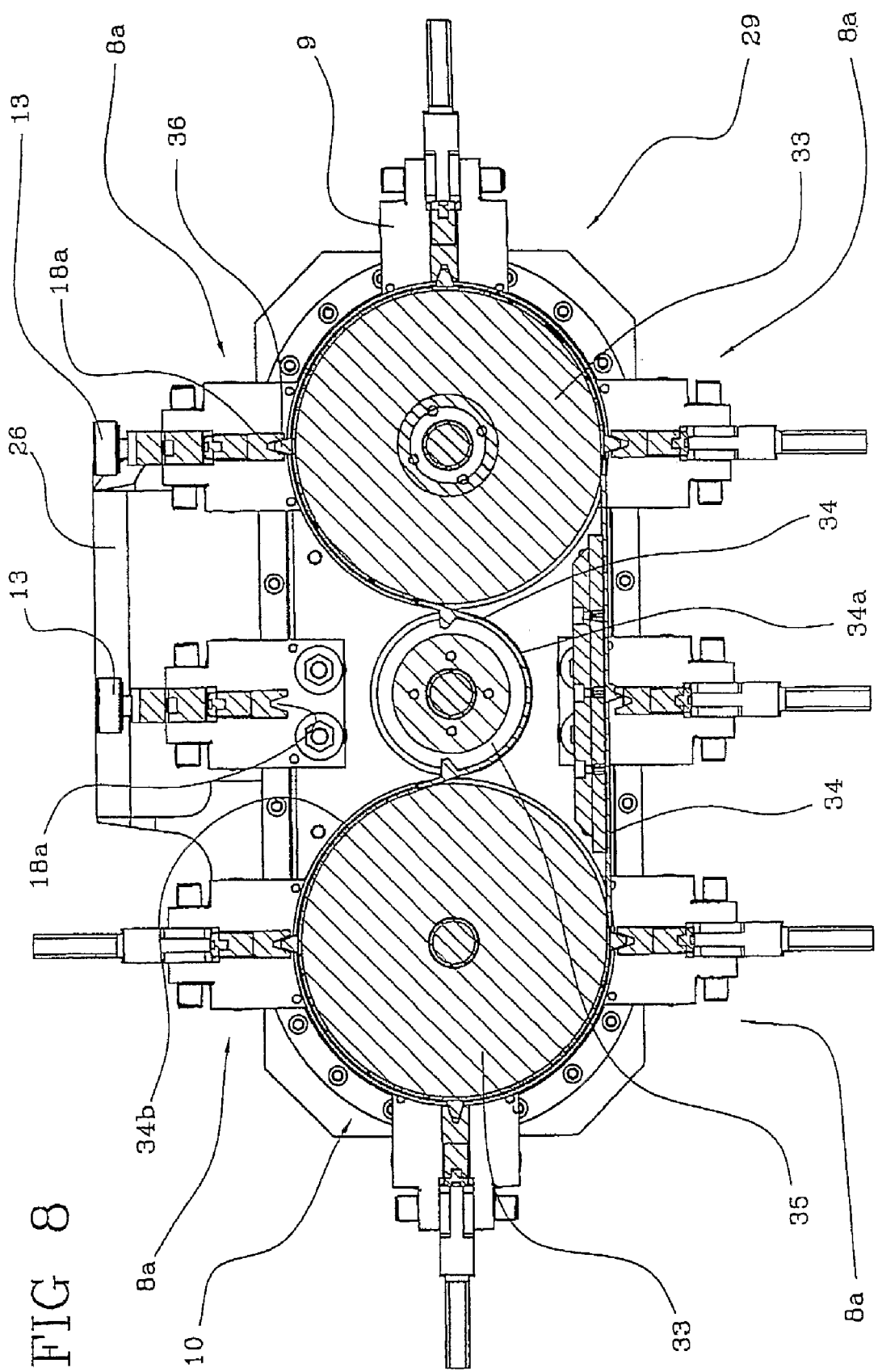
FIG. 8 is an additional side view partially sectioned along the lines VIII-VIII of the device shown in FIG. 3.

With reference to FIG. 8, the second motor member 29 has at least two pulleys 33 positioned mutually side by side, each pulley being positioned at an arched portion of junction 25.

The pulleys 33 rotate about respective axes, mutually parallel and parallel to the planar development of the first surface 15 of each base 11. The pulleys 33 are respectively associated to a belt 34 positioned substantially along the passive segment to transport each carriage 8a along the passive segment. The second motor member 29 also has at least one transmission roller 35 of the belt 34 positioned between two pulleys 33 to distance the belt 34 from the first motor member 28.

In detail, the belt 34 has an inner surface 34a able to abut against the pulleys 33 and an outer surface 34b opposite to the inner surface 34a oriented towards the guides 22 and associated to the transmission roller 35. As shown in FIG. 8, the belt 34 slides along a substantially two-lobed closed path defining the passive segment. Additionally, the belt 34 has a plurality of engagement pivots 36, mutually equidistant and extending from the outer surface 34b of the belt 34 (also visible in FIG. 4). The transmission roller 35 which can abut against the outer surface 34b of the belt 34, has respective seats able to receive the engagement pivots 36 during the actuation of the belt 34. The engagement pivots 36 are advantageously shaped complementarily to the openings 18a obtained in the respective second projecting elements 18 of the bases 11 and able to be inserted into the openings 18a.

In detail, when one of the carriages 8a is positioned at the passive segment and then placed at the belt 34, an engagement pivot 36 is inserted into the respective opening 18a and drives, by the motion of the belt 34, the respective carriage 8a along the passive segment. Advantageously, as shown in FIGS. 2, 5 and 7, the device 8 also has a plurality of walls 37 each of which is associated between two successive shoes 9 for abutting to a flank 2c of the tubular wrapper 3 transverse to the first and second lateral face 2a, 2b. In particular, the walls 37 have substantially plate-like development and their planar development is transverse to the planar development of the first surface 15 of each base 11. Preferably, a pair of walls 37 are provided, respectively associated between each carriage 8a and the adjacent carriage 8a.

As shown in FIG. 7, each wall 37 has a first end 37a pivotally engaged to a corresponding shoe 9 at the second surface 16 of the base 11, and a second end 37b opposite to the first. The second end 37b has a pivot, slidable within a slot whose development is parallel to the closed path and which is obtained in a projection of the respective shoe 9. In this way, the adjacent carriages 8a can approach or move away from each other making the pivot in the slot.

Each pair of walls 37 then abuts respective opposite flanks 2c of the tubular wrapper to give a substantially parallelepiped shape to each individual container 2 during the sealing of the region Z. Moreover, by virtue of the walls 37 associated to the shoes 9, it should be noted that the walls 37 are positioned abutting the opposite flanks 2c of the wrapper 3 only when the shoes are positioned along the active path.

Figure 10:
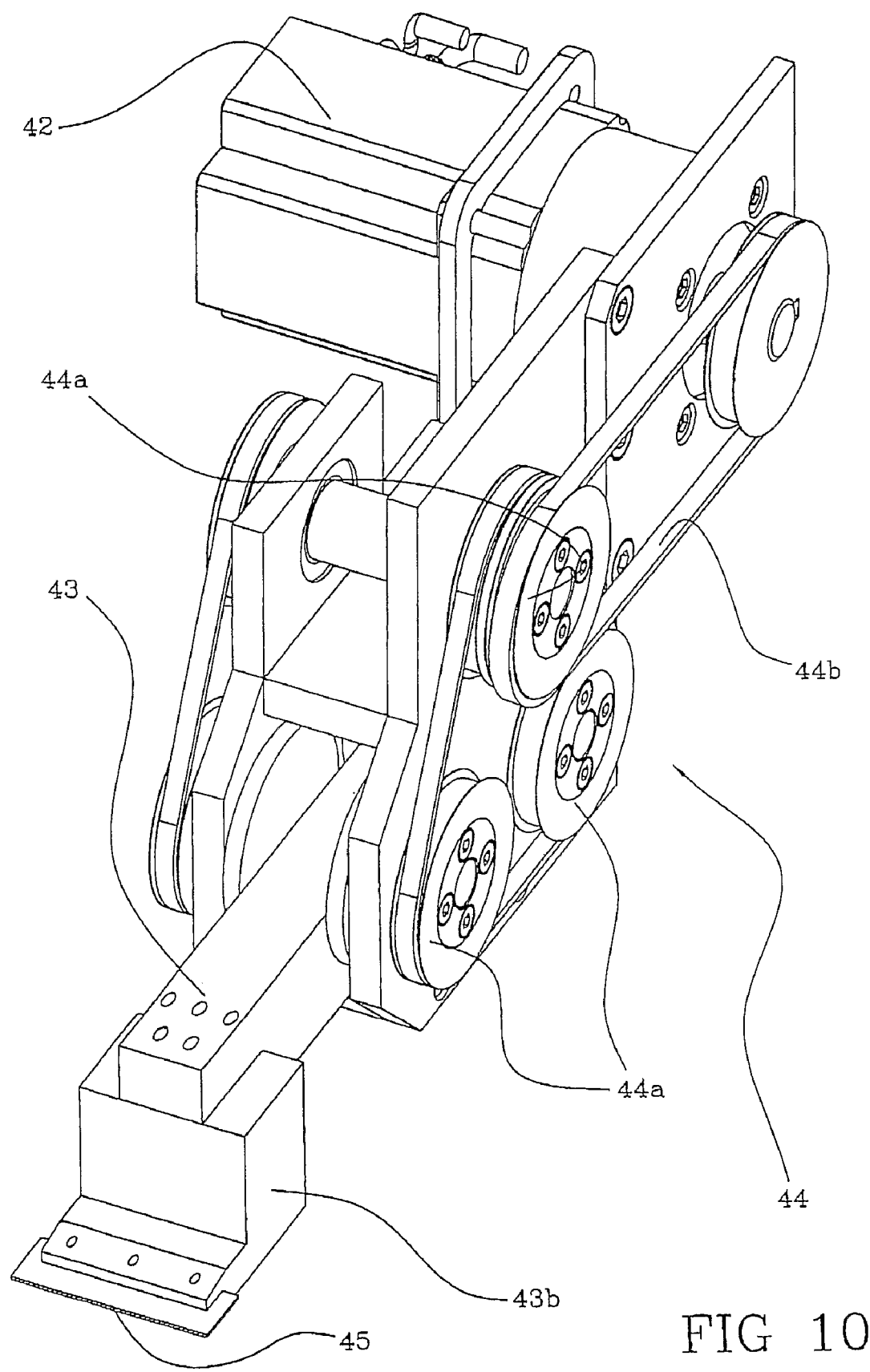
FIG. 10 is a perspective view of a construction detail of the device shown in FIG. 2.

The forming device 8, lastly, has means 38 for cutting the tubular wrapper 3, which are operatively active at the seal region Z to obtain the individual containers. The cutting means 38 has at least one separator device 39 illustrated in detail in FIG. 10 and positioned downstream of the active segment relative to the direction of advance A of the tubular package 3. The separator device 39 is constituted by a support frame 40 secured to a load-bearing structure 41 of the forming device 8 (see FIG. 2). The support frame 40 is constituted by an upright 40a developing above the tubular wrapper 3 transversely to the direction of advance A of the tubular wrapper 3. On the upright 40a is secured a motor 42, not described further in detail, operatively associated with an arm 43 movable transversely to the direction of advance A between a first position in which the arm 43 moves from the tubular wrapper 3 and a second position in which the arm 43 approaches to the seal region Z of the wrapper 3. In particular, the arm 43 has substantially longiform conformation and has a first end 43a positioned at the motor 42 and associated thereto by a transmission member 44. The transmission member 44 includes a connecting rod-crank kinematic mechanism with three pulleys 44a set in rotation by the motor 42 by a belt 44b. The first end 43a is pivotally engaged to two of the three pulleys 44a (see FIG. 10) at an off-centre point of the pulleys.

In this way, the rotation of the pulleys 44a determines the rectilinear reciprocating movement of the entire arm 43 between the respective first and second position. The arm 43 also has a second end 43b, opposite to the first end 43a, in which is a housing seat of a blade 45 whose longitudinal development is parallel to the longitudinal development of the first surface 15 of each base 11. Advantageously, when the arm 43 is in the second position, the blade 45 is positioned above the seal region Z in order to cut it longitudinally. After the transverse cut of the wrapper 3, the blade 45 abuts against the first surface 15 of the base 11 positioned below the blade 45. It should be noted that, when the blade 45 approaches the wrapper 3 to cut the seal region Z, the contrasting elements 14 positioned on the respective base 11 are moved away from the first surface 15. In this way, the arm 43 can freely approach the tubular wrapper 3 without being hindered by the contrasting elements 14.

In accordance with an alternative embodiment shown in FIG. 11, the separator device 38 is positioned downstream of the guides 22 along the direction of advance A. Two arms 43 and 43' are provided, facing each other and with each of them having the respective blade 45, 45'.

Still with reference to FIG. 11, it should be noted that the tubular wrapper 3 is positioned between the two arms 43, 43' which are actuated in mutually independent fashion to move closer or farther away from each other. Advantageously, when the arms 43, 43' are movable to approach each other, the respective blades 45 and 45' abut against each other in such a way as to cut the tubular wrapper 3 transversely at the respective seal region Z.

In the embodiment variant of FIG. 12, the second end 43b' of the arm 43' has a contrasting support 46, adapted to abut against the blade 45 of the other arm 43. The contrasting support constitutes a fixed support of the blade 45 and is advantageously provided with a recess (not shown in the figure) inside which is housed the blade 45.

FIG. 13 shows an additional embodiment variant of the separator device 38. Only one arm 43 as described above is present and it is positioned at the active segment above the side panels 26. Additionally, in accordance with this alternative solution, the bars 19 of the contrasting elements 14 have a through opening 47 which extends longitudinally along each bar 19. When the bars 19 both approach the first surface 15 of the respective base 11, the through openings 47 of the bars 19 are mutually side by side and aligned in such a way as to define a single opening whose longitudinal development matches the longitudinal development of the seal region Z. The respective base 11 has a recess 48 obtained on the first surface 15 and developing along the longitudinal development of the surface 15. Advantageously, as shown in FIG. 13, the recess 48 is placed at the openings 47 of the bars 19 when the bars 19 abut against the region Z to be sealed. When the contrasting elements 47 abut against the region to be sealed Z, the blade 45 can be inserted into the openings 47 of the bar 19. In this way, the blade 45 passes through the openings 47 and cuts the region Z longitudinally until it inserts itself into the recess 48.

The operation of the packaging unit 1 and of the respective forming device 8, described above in prevalently structural sense, is the following.

With reference to FIG. 1, the continuous strip 3a is fed from the respective reel 5 towards the forming member 6 of the tubular wrapper 3. The forming organ 6 folds at least one longitudinal edge of the continuous strip 3a on the other and longitudinally seals the region of superposition of the edges. In this way, the tubular wrapper 3 is defined and fed along the vertical direction A by appropriate members. The tubular wrapper 3 fed vertically has a respective upper opening defined by the respective longitudinal edges, not yet sealed. Advantageously, the filling member 7 delivers the incoherent material inside the tubular wrapper 3 through the upper opening. In this situation, the tubular wrapper 3 positioned vertically is filled only up to a certain height. The tubular wrapper 3 thus filled passes at the forming device 8 along the active segment of the closed path.

Starting from a carriage 8a which passes from the passive segment to the active segment, it should be noted that the first surface 15 of the base 11 abuts against the first lateral face 2a of the wrapper 3. The respective pivot 17a is positioned in the helical cavity 32a and by the rotation of the auger 32 the pivot slides along the cavity 32a driving the respective base 11 and the shoes 9 along the active segment. The sliding elements 13 of the respective shoes 9 slide along the primary rectilinear portions 23 of the respective guides 22 at the same velocity of advance as the tubular wrapper 3. When the shoes 9 are at the side panels 26, the respective contrasting elements 14 are positioned in the corresponding first position.

In particular, when the carriage 8a arrives at the side panels 26, each sliding element 13 positioned on the respective bar 19 slides on the first portion 27a of the contrasting surface and subsequently, following the twisted profile of the contrasting surface 27, it advances until reaching the second portion 27b. In this way, the sliding elements 13 positioned on the bars 19 move from a position in which they rotate on the first portion 27a about an axis that is parallel to the planar development of the first surface 15 of the base, to a position in which they rotate on the second portion 27b about an axis that is perpendicular to the planar development of the first surface 15. Consequently, the bars 19 that are associated to the respective sliding elements 13 rotate about the through pivot 20a for positioning above the second lateral face 2b to press the lateral face 2b. Because of the pressing of the bars 19 against the base 11, the lateral faces of the wrapper 3 are sealed and the sealing region Z obtained during the continuous advance of the wrapper 3 along the direction A.

When the carriage 8a advances outside the side panels 26, the contrasting elements return to the second position in which the bars 19 are moved away from the base 11. Advantageously, moreover, a spring 50 (shown in FIG. 4), positioned about the pivot 20a, determines the return of the contrasting element 14 in the second position. It should be noted that advantageously, multiple carriages 8a are positioned simultaneously on the active segment in such a way that at least two successive carriages 8a are at the side panels 26. The tubular wrapper 2 can be sealed simultaneously in multiple parts or individually at different times.

With reference to the embodiment in which the pitch of the cavity 32a is variable, successive carriages 8a move faster in the initial segment. In this way, a displacement of the respective seal regions Z which are mutually approached. Advantageously, because of this longitudinal squashing of the tubular wrapper 3 the individual containers 2 are deformed to a specific shape. For example, during the longitudinal squashing of the wrapper 3, the flanks 2c of the wrapper 3 are deformed towards the exterior in such a way as to adhere to the walls 37. In this situation, the containers 2 are formed with parallelepiped shape in which the flanks 2c constituted opposite lateral walls.

In the embodiment of FIG. 9, each carriage 8a is associated in alternating fashion to one of the two augers 32, 32'. Each pair of carriages 8a, which are respectively associated to the first or to the second auger 32, 32', move with different velocities. For example, if the helical cavities have different pitch (or if the helical cavities are identical but the respective augers are fed in mutually independent fashion) the carriage 8a associated to the auger 32 having the helical cavity 32a with greater pitch (auger fed at higher velocity) moves faster than the carriage 8a that precedes it in such a way as to move the seal regions Z to each other and to define the squashing of the container 2. When the contrasting element 14 return in the second position, the carriage 8a is positioned at the separator device 38. At this point the arm 43 is actuated towards the base 11 until the respective blade 45 abuts against the seal region Z to cut the same. As a result of the transverse cut of the tubular wrapper 3, the blade 45 bears on the first surface 15 of the base 11 and subsequently the arm 43 is moved away from the base 11. Advantageously, the containers 2 previously filled and formed are obtained as a result of the transverse cut.

In the embodiments illustrated in FIGS. 11 and 12, the tubular wrapper 3 is made to advance sealed outside the guides 22 to allow the two arms 43 to approach each other and to cut the wrapper along the region Z to define the containers 2.

In accordance with the embodiment of FIG. 13, the separator device 13 is positioned above the side panels 26 and the arm 43 approaches the wrapper 3 when the contrasting elements 14 are still pressing and sealing the wrapper 3. The blade 45 passes through the openings 47 obtained on the bars 19 to cut the region Z whilst it is sealed. Advantageously, at the end of the sealing operation, i.e., when the contrasting elements 14 move away from the tubular wrapper 3, the container 2 is already detached from the remained of the wrapper 3. Once the transverse seal is completed, the carriage 8a passes from the active segment to the passive segment. The pivot 17a reaches the end of its travel in the helical cavity 32a and the base 11 is positioned at one of the two pulleys 33. One of the engagement pivots 36 positioned on the belt 34 is then inserted into the opening 18a driving the carriage 8a along the passive segment in the two arched portions 25 and in the secondary rectilinear portion to return the pair 9 to the active segment.

The present invention solves the problems noted in the prior art and achieves the proposed object.

First of all, the forming device 8 allows accomplishing the sealing and the forming of the containers 2 during the travel of the tubular wrapper 3. Because of the movement along the active segment of the carriages 9 in synchrony with the advance of the wrapper 3 along the direction A, the bars 19 and the respective base 11 do not rub on the wrapper 3. Advantageously, the seals in the region Z and the forming of each individual container 2 are accomplished correctly.

It should also be noted that the described device has very small bulk and a particularly simple structure. This advantage is due to the presence of a single pair of guides 22 adapted to support and guide the shoes 9.

Advantageously, using the contrasting elements 14 movable on the respective bases 11, additional elements positioned in front of the forming device 8 and adapted to press and seal the wrapper 3 are eliminated. For this reason, the forming device 8, in addition to having reduced size allows a marked reduction in construction and commercialisation costs and easy accessibility in case of failure.

Lastly, another advantage is provided by the ability to give a particular shape to the container 2 during the sealing operations.

The invention claimed is:

1. A device for forming containers produced continuously from a tubular wrapper fed along a substantially vertical direction of advance, comprising:
   a plurality of support carriages movable along a respective closed path, said closed path having at least one active segment parallel to said direction of advance;
   each support carriage having a sealing base for being actuated on a first lateral face of said tubular wrapper and a contrasting element movable between a first closed position in which the contrasting element is approached to said base and engaged to a second lateral face of the tubular wrapper opposite to the first lateral face, and a second position in which the contrasting element is movable away from said base;
   means for actuating said plurality of support carriages along the path to move each carriage at a variable velocity along the active segment; and
   means for cutting said tubular wrapper operatively active at a sealing region to obtain said containers; wherein said means for actuating said support carriages comprise at least one supporting guide to guide the support carriages along said closed path, a first motor member to actuate the support carriages along the active segment and a second motor member to actuate the support carriages alone a passive segment opposite to said active segment.

2. Device as claimed in claim 1, wherein each support carriage is progressively slowed along said active segment.

3. Device as claimed in claim 1, wherein said first motor member comprises a transport element extending parallel to said active segment; and a motor driving said transport element.

4. Device as claimed in claim 3, wherein said transport element has an auger able to rotate about a respective longitudinal axis corresponding to said active segment; said sealing base having an insertion pivot which engages a helical cavity obtained on an outer surface said auger to move the respective carriage along the active segment of the closed path.

5. Device as claimed in claim 4, wherein said helical cavity of the auger has a variable pitch.

6. Device as claimed in claim 5, wherein said helical cavity has a first portion and a second portion, contiguous to the first portion; said first portion of the helical cavity having greater pitch than the second portion.

7. Device as claimed in claim 6, wherein at least two carriages are engaged to the auger, each of which having the respective insertion pivot engaged to the helical cavity respectively at the first and second portion.

8. Device as claimed in claim 4, wherein said transport element has a first and a second auger side by side to each other and each of which is rotatable about a respective longitudinal axis corresponding to said active segment.

9. Device as claimed in claim 8, wherein said insertion pivot of each base can be inserted into a helical cavity, obtained on the outer surface of one of said first or second auger to move the respective carriage along the active segment of the closed path.

10. Device as claimed in claim 9, wherein at least one carriage is engaged to the first auger and the subsequent and preceding carriage are engaged to the second auger.

11. Device as claimed in claim 9, wherein the helical cavity of the first auger has a greater pitch than the pitch of the helical cavity of the second auger.

12. Device as claimed in claim 9, wherein the helical cavity of the first auger has a smaller pitch than the pitch of the helical cavity of the second auger.

13. Device as claimed in claim 9, wherein the helical cavity of the first auger and the helical cavity of the second auger have equal pitch; each auger being actuated independently and at different velocities.

14. Device as claimed in claim 1, wherein said actuating means further comprise two support guides, mutually parallel and distanced from each other, each support carriage comprising a respective shoe engaged to the support guide.

15. Device as claimed in claim 14, wherein each guide has a rail having an elliptical shape and defining said closed path; each rail having: a primary rectilinear portion parallel to said direction of advance of the tubular wrapper and corresponding to said active segment of the closed path, said primary rectilinear portion having a region for the entrance of the tubular wrapper and a region for the exit of the wrapper; a secondary rectilinear portion opposite and parallel to said primary rectilinear portion, two arched junction portions between said primary rectilinear segment and secondary rectilinear portion, said secondary rectilinear portion and arched portions corresponding to said passive segment of the closed path.

16. Device as claimed in claim 1, comprising a plurality of walls each engaged to each carriage and to the respective subsequent carriage, said wall being able to abut against a respective flank of the tubular wrapper transverse to the first and second lateral face.

17. Device as claimed in claim 16, comprising a plurality of pairs of walls, each pair being engaged respectively to one of said support carriages and to the respective subsequent support carriage and being able to abut against respective opposite flanks of the tubular wrapper.

18. A unit for packaging containers comprising:
   means for feeding a continuous strip of paper material;
   a forming member to join opposite longitudinal elements of said continuous strip and to form a tubular wrapper; and
   a filling member positioned downstream of said forming member to fill the tubular wrapper with an incoherent material;
   a forming device for forming containers produced continuously from the tubular wrapper wherein said forming device comprises:
   a plurality of support carriages movable alone a respective closed path, said closed path having at least one active segment parallel to said direction of advance,
   each support carriage having a sealing base for being actuated on a first lateral face of said tubular wrapper and a contrasting element movable between a first closed position in which the contrasting element is approached to said base and engaged to a second lateral face of the tubular wrapper opposite to the first lateral face, and a second position in which the contrasting element is movable away from said base,
   means for actuating said plurality of support carriages along the path comprising at least one supporting guide to guide the support carriages along said closed path, a first motor member to actuate the support carriages alone the active segment and a second motor member to actuate the support carriages alone a passive segment opposite to said active segment, and means for cutting said tubular wrapper operatively active at a sealing region to obtain said containers; wherein said means for actuating said support carriages comprise at least one supporting guide to guide the support carriages along said closed path, a first motor member to actuate the support carriages along the active segment and a second motor member to actuate the support carriages along a passive segment opposite to said active segment.

* * * * *